April 2, 1935.  E. C. MILES  1,996,383
GLASS CUTTING TABLE
Filed July 7, 1934  4 Sheets-Sheet 1
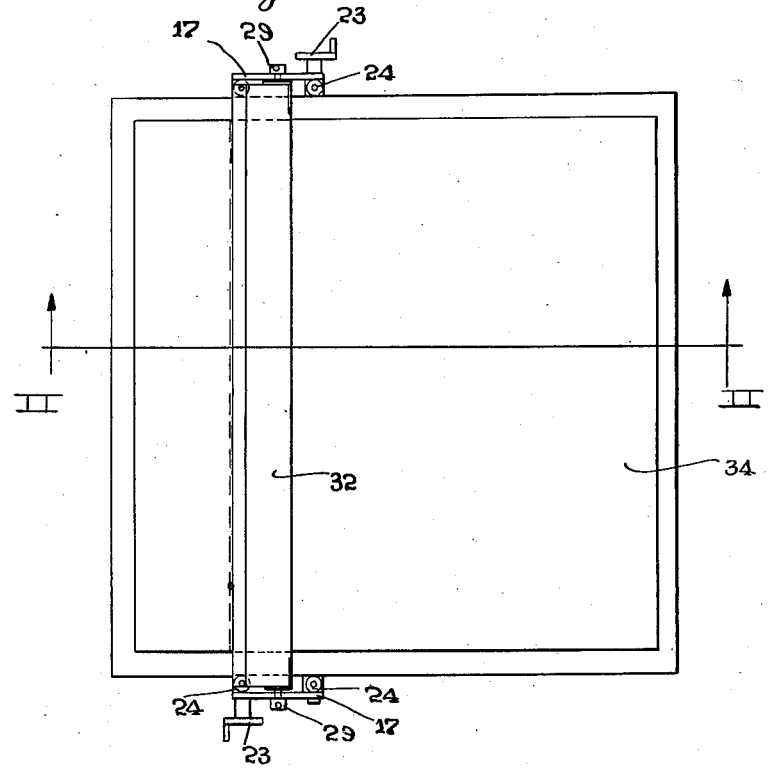
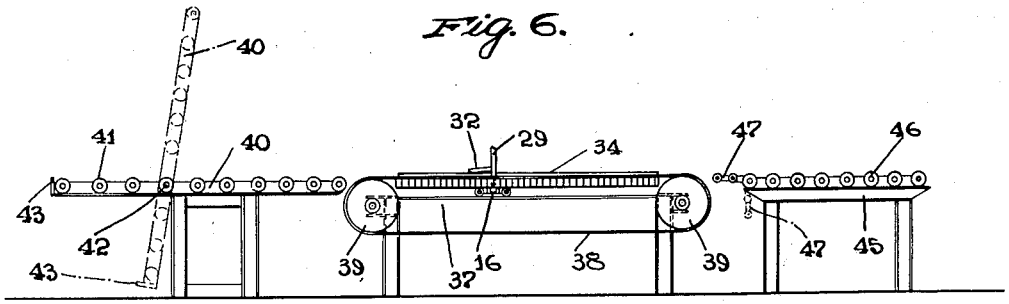
INVENTOR
E. C. Miles
BY Bradley & Bee
ATTORNEYS

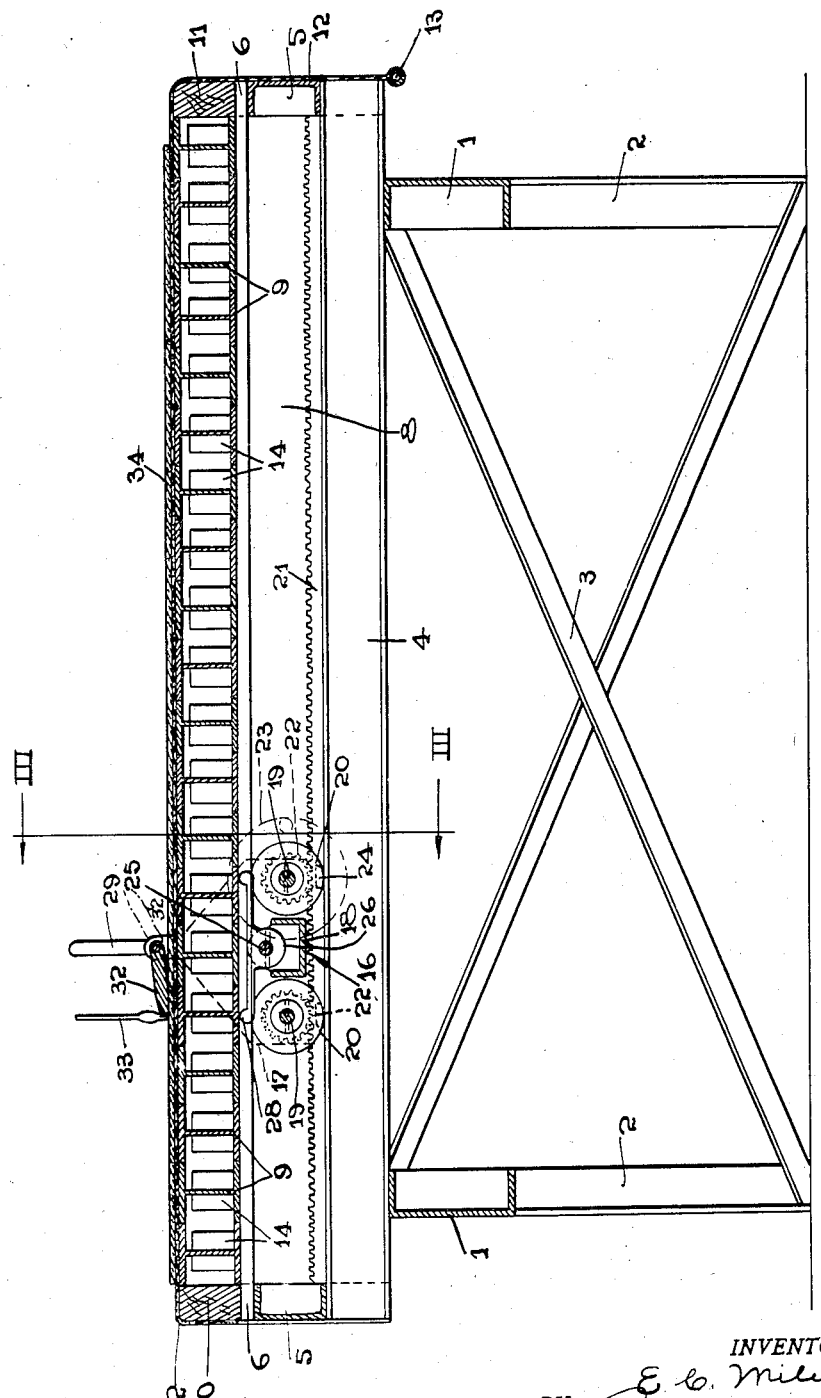

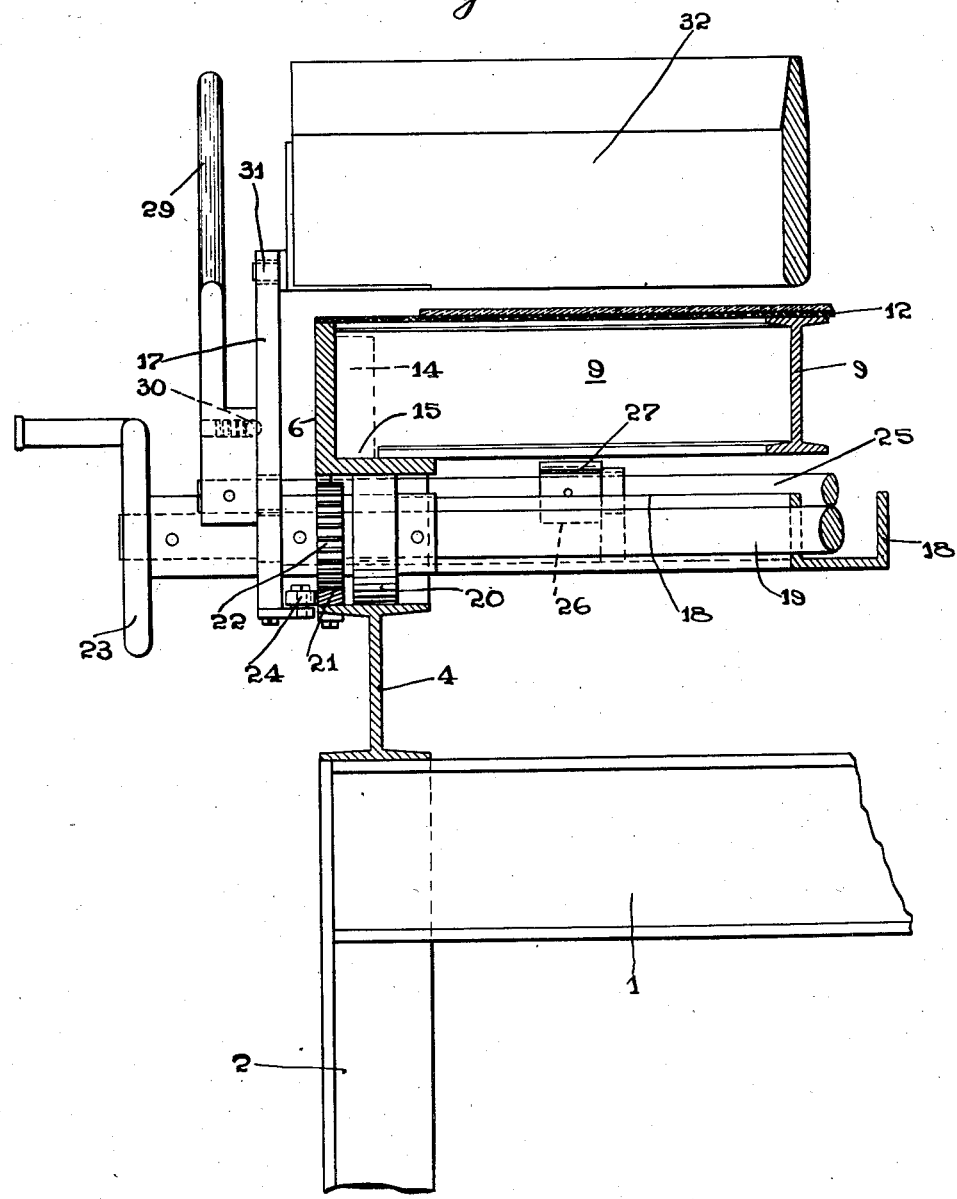

April 2, 1935.  E. C. MILES  1,996,383
GLASS CUTTING TABLE
Filed July 7, 1934  4 Sheets-Sheet 4

INVENTOR
E. C. Miles
BY Bradley + Bee
ATTORNEYS

Patented Apr. 2, 1935

1,996,383

UNITED STATES PATENT OFFICE 1,996,383

GLASS CUTTING TABLE

Ewell C. Miles, Tarentum, Pa., assignor to Pittsburgh Plate Glass Company, a corporation of Pennsylvania Application July 7, 1934, Serial No. 734,190

6 Claims. (Cl. 49—48)

Figure 4:
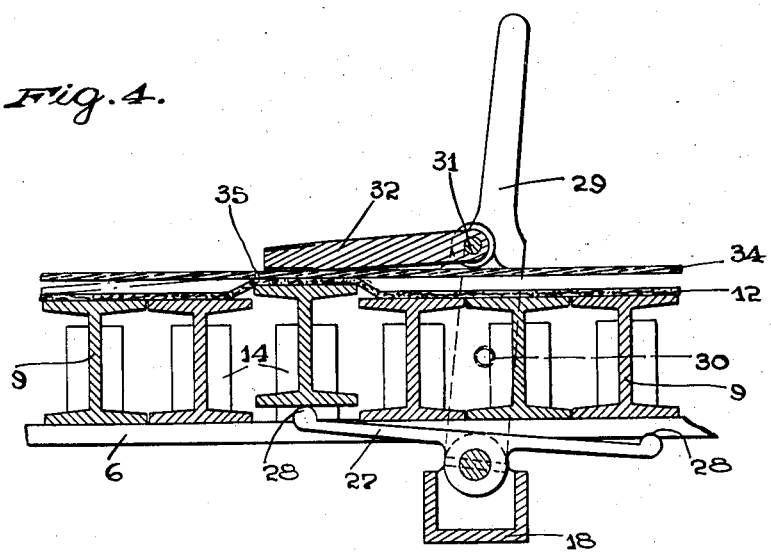
Figure 5:
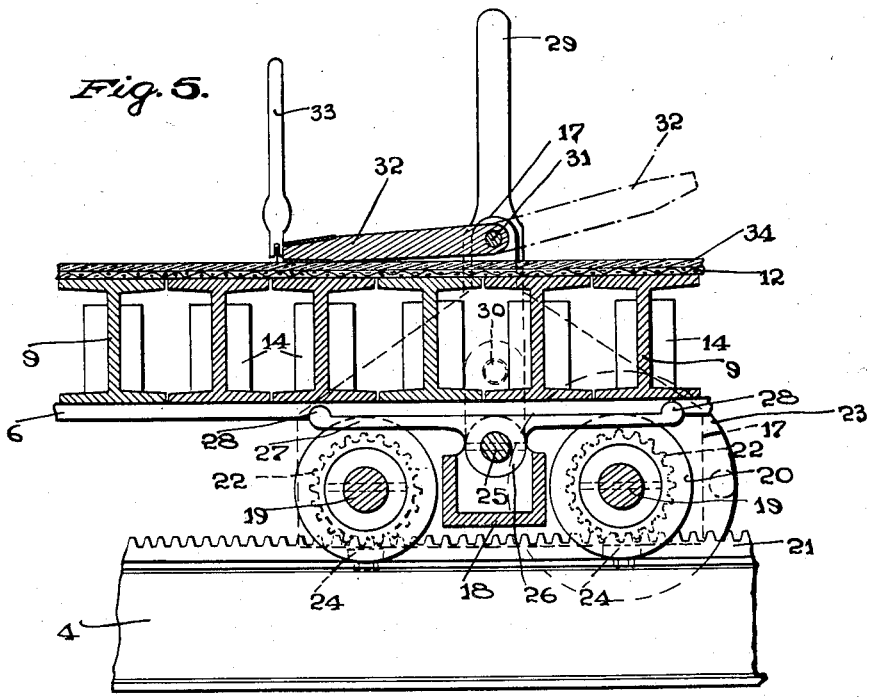

The invention relates to a cutting table for glass sheets of very large size which ordinarily requires two operators. It has for its principal objects; the provision of an improved table construction on which glass of any size may be conveniently snapped after the scoring operation by one operator at any point along the length of the table; the provision of an improved snapping and straight edge or rule construction arranged so that the positioning of the straight edge brings the snapping means into proper position to apply pressure to crack the glass after it has been scored along the edge of the rule; and the provision of a construction of the type specified in which the straight edge is reversible, and the snapping means coordinated to snap the glass when the straight edge is so reversed, so that the operator may work as conveniently from one end of the table as from the other end. Certain embodiments of the invention are illustrated in the accompanying drawings, wherein:

Figure 1 is a plan view of the table. Fig. 2 is a section on the line II—II of Fig. 1. Fig. 3 is a section on an enlarged scale on the line III—III of Fig. 2. Figs. 4 and 5 are sections on an enlarged scale through a part of the construction on the line II—II of Fig. 1, Fig. 4 showing the parts in snapping position, and Fig. 5 showing the parts in the position occupied before the snapping operation. And Fig. 6 is a side elevation through a modified construction in which an endless transfer belt is employed.

Referring to the construction of Figs. 1 to 5, the underframing of the table is made up of the channels 1, the supporting legs 2 and the angle tie members 3. Secured rigidly to the channels 1 are the longitudinally extending I-beams 4, which in turn support the transverse channels 5. Mounted upon the channels 5 in parallel with the I-beams 4 are the angles 6 (Fig. 3) which form the side frame members of the table top, the space 8 (Fig. 2) between the members 6 and the I-beams 4 giving the necessary room for the operation of the carriage, later described, which supports the cracking off means.

The table top is made up of a plurality of spaced I-beams 9, 9, 9, etc., preferably of aluminum having their upper faces flush so that they constitute the top of the table. The beams or bars 9, 9, 9, etc. are mounted for independent vertical movement so that any one of them may be pushed upward to apply cracking force to a sheet of glass resting upon the top of the table. At each end of the table top resting upon the channels 5, 5 are the end members 10, 11 of the table top, preferably of wood. To the member 10 is secured one end of the felt sheet 12, which extends over the top of the table and down past the member 11, as indicated in Fig. 2, thus constituting a yielding support for the glass sheet. The bars 9, 9 are guided in their vertical movements by pairs of clips 14, 14 secured to the angles 6, which constitute the side frame members of the table top. The lower flanges of the bars 9 are cut away, as indicated at 15 (Fig. 3), so that only the web of the bars 9 projects between the guide clips 14, 14. While the bars 9 are preferably made of aluminum and are in the form of I-beams, it will be understood that any other suitable form of bar may be employed and that it is not necessary to use a metal bar, although this is preferred.

Mounted for movement in the space 8 is a carriage 16, which supports the cracking off means, such cracking off means being arranged, as later described, to lift any one of the bars 9 to apply cracking pressure to the glass depending upon the position of the carriage. The carriage comprises a pair of end frame members 17, one of which is shown in Fig. 3 and a transverse cross tie 18 in the form of a channel, as indicated in Figs. 2 and 5. Journalled in the frame members are a pair of transversely extending shafts 19, 19 which have keyed thereto the rollers 20. These rollers ride upon the tops of the I-beams 4, 4, which thus constitute a track for the carriage. Bolted to the top flange of each of the I-beams 4, 4 is a rack 21 and these racks are engaged by pinions 22 keyed to each end of the shafts 19, 19. Each of the shafts 19 is provided with a hand wheel 23 (Figs. 1 and 3) which serves as a means by which the operator can move the carriage to any desired position longitudinally of the table. In order to further assist in guiding the carriage, each of the side members 17 carries a pair of rolls 24, 24 (Figs. 1 and 3) engaging the sides of the rack bars 21.

Extending from one side member 17 of the carriage to the other side member and journalled therein is a shaft 25 which carries the snapping off means. This snapping off means comprises a pair of members 26 pinned to the shaft 25 and provided with a pair of oppositely extending arms 27 having ribs 28 at their ends for engaging the bars 9 when the shaft 25 is rotated in either direction. The shaft 25 is provided at each end with an operating arm 29. The hub of each arm is provided with a spring pressed indexing ball 30, so that when the arm 29 is in vertical position, the ball engages a recess in the plate 17, thus yieldingly maintaining the parts in the position shown in Figs. 3 and 5. Lying above the table top and pivotally supported upon the carriage, as indicated at 31, is a straight edge 32. This straight edge may occupy the position to the left of the center line of the carriage, as indicated in Fig. 5, or it may be swung through 180 degrees to the other side of the center line of the carriage, depending upon which end of the table the cutter is working from. If he is working from the left hand end of the table, the straight edge will occupy the position indicated in full lines in Fig. 5, while if he is working at the right hand edge of the table, the straight edge will be swung through 180 degrees to its other position, the dot and dash lines showing the bar as it approaches such position.

The parts are illustrated in neutral position in Fig. 5, the numeral 33 here indicating the cutter which is employed to score the glass transversely of the table. After the scoring operation and in order to snap the glass sheet 34 along the line of scoring, the lever or arm 29 is swung to the right, raising the lifting arm 27 and the bar 9 to the position shown in Fig. 4. The upward movement of the bar 9 lifts the felt sheet 12, thus applying pressure to crack the glass at 35 along the line of scoring. It is thus possible for the operator to crack the glass sheet regardless of its width, so that an operator for performing this work is not required at each side of the table, as has heretofore been the case. It will be observed that the cracking off mechanism and the straight edge are so arranged and proportioned that after the scoring operation, the cracking off device is correctly positioned to apply the necessary snapping pressure.

Fig. 6 illustrates a modification in which the table 37 is constructed throughout in substantially the same manner as the table heretofore described except that a thin driven belt 38 is substituted for the felt cover 12. This belt is mounted upon a pair of pulleys 39, 39 at the ends of the table which may be driven intermittently to position the glass upon the table by any suitable driving means, which are not shown. The glass sheets may be conveniently delivered to the table 37 by means of the tilting table 40 provided with the rollers 41 and pivoted at 42. This table is provided at one edge with a supporting ledge 43. The glass to be cut is delivered to this tilting table by means of a vacuum frame or other suitable means, after which the table is tilted to horizontal position, as indicated in full lines and the glass is moved onto the table 37. After the scoring and cracking off operation, the belt 38 is operated to shift the glass sections onto the run-off table 45 provided with the usual rolls 46. Intermediate the table 37 and the run-off table is a drop gate 47, which may be moved down to the vertical position shown in dotted lines between operations. The use of the tilting table 40 and the drop apron 47 provides space for the operator who has to stand at the end of the table in scoring the glass.

What I claim is:

1. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, means on the carriage for lifting any one of the bars depending on the position of the carriage, means for operating said last means, and a sheet of flexible material overlying the tops of the bars.

2. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, means on the carriage for lifting any one of the bars depending on the position of the carriage, means for operating said last means, and a sheet of flexible material overlying the tops of the bars secured at one end to the table and provided at its other end with tensioning means.

3. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, means on the carriage for lifting any one of the bars depending on the position of the carriage, means for operating said last means, and a sheet of flexible material overlying the tops of the bars secured at one end to the table and provided at its other end with a weight for holding the sheet under tension.

4. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, means on the carriage for lifting any one of the bars depending on the position of the carriage, means for operating said last means and an endless belt of flexible material having its upper flight extending over the tops of the bars.

5. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, means on the carriage for lifting any one of the bars depending on the position of the carriage, means for operating said last means, a straight edge supported upon the carriage and extending across the top of the table, and a sheet of flexible material overlying the tops of the bars.

6. A glass cutting table comprising a frame, a body portion consisting of a series of bars arranged side by side with their upper surfaces flush so as to form the top of the table and each mounted for independent vertical movement in the frame, a carriage mounted for movement longitudinally of the table beneath the bars, a pair of lifting devices lying on opposite sides of the center line of the carriage, means for raising either one of said devices so that it will lift the bar lying thereabove, a reversible straight edge mounted on the carriage above the top of the table arranged so that in one position it lies on one side of the center line of the carriage and in its other position it lies on the other side of such center line, and a sheet of flexible material overlying the tops of the bars.

EWELL C. MILES.